United States Patent
Kunz et al.

(10) Patent No.: US 6,185,539 B1
(45) Date of Patent: Feb. 6, 2001

(54) PROCESS OF LOW SAMPLING RATE DIGITAL ENCODING OF AUDIO SIGNALS

(75) Inventors: Oliver Kunz, Sesslach; Martin Dietz, Nürnberg; Rainer Buchta, Herzogenaurach; Jürgen Zeller, Ismaning; Karlheinz Brandenburg, Erlangen; Martin Sieler, Lauf; Heinz Gerhäuser, Waischenfeld, all of (DE)

(73) Assignee: Fraunhofer-Gesellschaft zur Förderung der angewandten Forschung e.V., Munich (DE)

( * ) Notice: Under 35 U.S.C. 154(b), the term of this patent shall be extended for 0 days.

(21) Appl. No.: 09/077,395

(22) PCT Filed: Feb. 19, 1997

(86) PCT No.: PCT/EP97/00792

§ 371 Date: May 26, 1998

§ 102(e) Date: May 26, 1998

(87) PCT Pub. No.: WO97/38497

PCT Pub. Date: Oct. 16, 1997

(30) Foreign Application Priority Data

Apr. 4, 1996 (DE) .............................. 196 13 643

(51) Int. Cl.$^7$ ..................................... H04B 1/66
(52) U.S. Cl. ............................................ 704/500
(58) Field of Search .................. 704/500, 501, 704/205

(56) References Cited

FOREIGN PATENT DOCUMENTS

| 0 457 391 | * 5/1991 | (EP) | ............................. H04B/1/66 |
| 0 525 774 A2 | * 7/1992 | (EP) | ............................. H04B/1/66 |
| 0 612 159 A2 | * 2/1994 | (EP) | ............................. H04B/1/66 |

OTHER PUBLICATIONS

ISO/IEL "Standard 11172–3" ISO pp. 73 and 741.*
ISO/IEL "Standard 13818–3" ISO pages all.*
ISO/IEL "STandard 13818-3 amendment" ISO pages all.*

* cited by examiner

Primary Examiner—David R. Hudspeth
Assistant Examiner—Harold Zintel
(74) Attorney, Agent, or Firm—Dougherty & Clements LLP

(57) ABSTRACT

In a method for coding an audio signal digitized at a low sampling rate to obtain time domain audio samples. A frequency domain representation of the time domain audio samples is produced. The frequency domain representation includes successive frequency lines. These frequency lines are grouped into a plurality of scale factor bands. The successive frequency lines in a scale factor band are coded with the same scale factor. A plurality of regions is formed by grouping the scale factor bands, wherein successive scale factor bands form a region within which all the scale factors are coded with the same number of bits, which is determined according to the largest scale factor of the region. The scale factors assigned to scale factor bands within the highest region that includes the higher frequency successive frequency lines are set to zero. The frequency lines in the highest region are coded using the zero-valued scale factors that correspond to a multiplication factor of 1. The scale factors for the highest region, however, are not coded. Thus, the bits that would be required for coding these zero-valued scale factors are saved and can be used for a finer quantization of the rest of the spectrum. Additionally, this coding method when applied to ISO/IEC 13818-3 as a low sampling rate modification thereof only requires minimal changes with respect to this Standard.

6 Claims, 3 Drawing Sheets

PROCESS OF LOW SAMPLING RATE DIGITAL ENCODING OF AUDIO SIGNALS

BACKGROUND OF THE INVENTION

1. Field of the Invention

The present invention refers to a method for coding an audio signal which has been digitized at a low sampling rate. In particular, the invention refers to a coding method which is only slightly modified relative to the Standard ISO/IEC 13878-3 (MPEG2 layer 3) and which enables audio signals which are digitized at a lower sampling rate than the sampling rate according to the Standard ISO/IEC 13818-3 to be transmitted at a low bit rate.

2. Description of the Related Art

The existing Standard ISO/IEC 13818-3 published in May 15, 1995 defines with layer 3 a coding method for signals with sampling frequencies between 24 kHz and 16 kHz and makes possible bit rates of down to 8 kbit/s. In particular at this very low bit rate, which is very attractive for a transmission in computer networks e.g., the use of still smaller sampling frequencies would be desirable. The cited Standard ISO/IEC 13818-3 does not provide these, however.

SUMMARY OF THE INVENTION

Starting from this prior art it is therefore the object of the present invention to develop further the cited method for coding audio signals in such a way that, with the smallest possible deviation from the Standard ISO/IEC 13818-3, sampling can be performed at sampling rates which do not conform to the Standard ISO/IEC 13818-3; furthermore, decoding with existing decoders should be possible without much being needed in the way of adaptation.

The present invention provides a method for coding an audio signal digitized at a low sampling rate to obtain time domain audio samples, comprising the steps of producing a frequency domain representation of the time domain audio samples, the frequency domain representation including a total number of successive frequency lines; subdividing the total number of successive frequency lines into a plurality of scale factor bands each scale factor band having a number of successive frequency lines wherein a scale factor is assigned to each scale factor band, the assigned scale factor being used for coding the frequency lines in the respective scale factor band; forming a plurality of regions, each region including a plurality of successive scale factor bands wherein the scale factors assigned to the plurality of scale factor bands in a region are each coded with the same number of bits, which is determined according to the largest scale factor of the region, and wherein a region including the scale factor bands having frequency lines that correspond to the higher frequency range frequency lines among the frequency lines in all regions is the highest region; and setting to a value of zero the scale factors that are assigned to the scale factor bands in at least the highest region to obtain zero-valued scale factors, the value of zero corresponding to a multiplication factor of 1; coding the frequency lines of at least the highest region with the zero-valued scale factors; and refraining from coding the zero-valued scale factors themselves.

In general the present invention provides coding of audio signals which have been digitized at a sampling rate which is lower than the sampling rate according to the Standard ISO-MPEG2 layer 3.

In general in the case of the subject matter of the present invention, as also in the case of the known Standard ISO/IEC 13818-3, the successive frequency lines of the digitized audio signal which are assigned to a scale factor band are coded with the same scale factor, this being transmitted together with the coded scale factor band (see table B.8 of ISO/IEC 13818-3).

In further conformity With the known method according to the cited Standard ISO/IEC 13818-3, successive scale factor bands form a region within which all the scale factors are each coded with the same number of bits, which is determined according to the largest scale factor of this region (see section 2.5.2.13 of ISO/IEC 13818-3).

In the Standard ISO-MPEG2 layer 3, all the scale factor bands of all the regions are assigned scale factors. Only the last band, wherein lie those frequency lines remaining after the desired assignment of the frequency lines, does not have a scale factor when coding (see section 2.5.2.11, subparagraph 'scalefac 1[gr][tc][sfb], scalefac s[gr][tc][sfb] [window], is pos[sfb]' of ISO/IEC 13818-3).

In contrast to the Standard ISO/IEC 13818-3, the present invention is so conceived that at least the frequency lines of the highest region of scale factor bands are coded with the scale factor 0, so that for at least the highest region no scale factor is coded and transmitted. The bits which are saved through the missing scale factor or scale factors are used for the finer quantization, compared to the Standard ISO/IEC 13818-3, of the frequency lines in the rest of the spectrum.

According to a further important aspect of the present invention, the grouping of the frequency lines into scale factor bands is modified relative to the cited Standard ISO/IEC 13818-3 in such a way that the scale factor bandwidths within the highest region are reduced relative to the scale factor bandwidths of the highest region according to the Standard ISO-MPEG2 layer 3.

BRIEF DESCRIPTION OF THE DRAWINGS

The foregoing and other objects will become more readily apparent by referring to the following detailed description and the appended drawings in which.

DESCRIPTION OF THE PREFERRED EMBODIMENTS

In the following a preferred embodiment of the method according to the present invention will be explained in more detail.

In the embodiment of the method according to the present invention a frame header which is a modification of the standard MPEG frame header is used so as to signal the non-standard sampling rate and the non-standard coding for a decoder. For this purpose the hexadecimal sync word "FFF" (hexadecimal for twelve ones) is replaced by the sync word "FFE" (eleven ones and a zero) within the header. When a decoder recognizes a sync word which has been modified in this way, this is an indication that the bit stream contains a signal which, compared to the Standard MPEG2, has been digitized at preferably half the sampling rate (12 kHz, 11.025 kHz or 8 kHz) (10 in FIG. 1, FIG. 2a). In all other respects the structure of the bit stream is unchanged with respect to the Standard ISO/IEC 13818-3.

Figure 1:
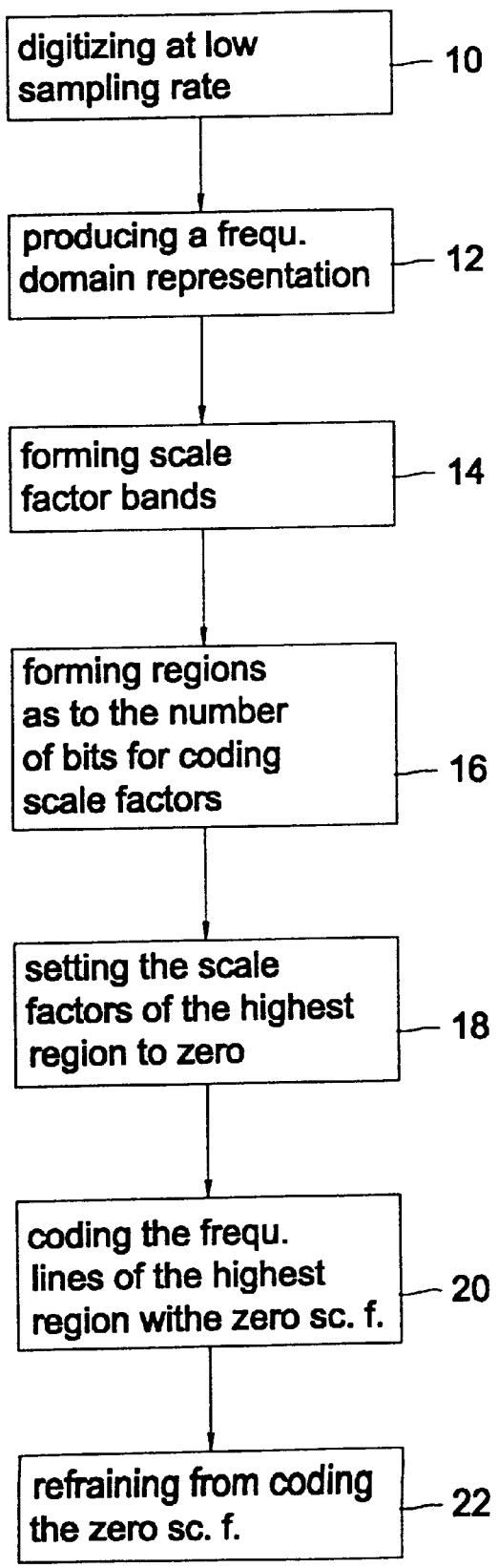
FIG. 1 illustrates a general block diagram of the inventive method.
Figure 2A:
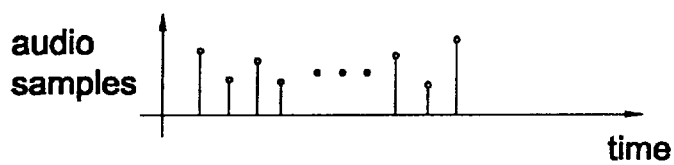
FIG. 2a illustrates a digitized audio signal having audio samples.
Figure 2B:
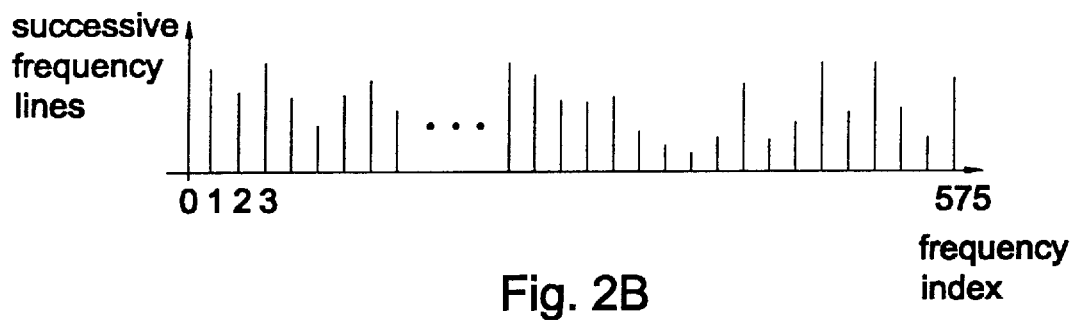
FIG. 2b illustrates a frequency domain representation of the audio samples in FIG. 2a, the frequency domain representation having 576 successive frequency lines as in ISO/IEC 13818-3 (MPEG2 layer 3)
Figure 2C:
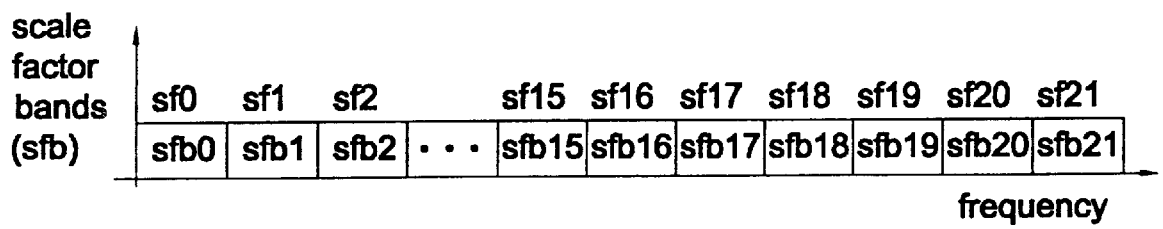
FIG. 2c illustrates the subdivision of the frequency domain representation into 22 scale factor bands (sfb0 to sfb21) as in ISO/IEC 13818-3 (MPEG2 layer 3)

After digitizing, a frequency domain representation of the thus obtained audio samples is produced (12 in FIG. 1, FIG. 2b). In the embodiment with a sampling rate of 8 kHz to be discussed here, the grouping (14 in FIG. 1, FIG. 2c) of the frequency lines into scale factor bands is also modified. A construction in the bit stream format of layer 3 is exploited here, with the aid of which the number of bits available for the coding of the spectrum can be increased.

Figure 2D:
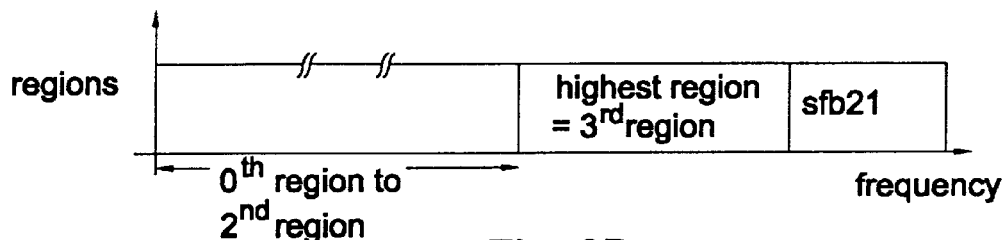
FIG. 2d illustrates the four regions (region 0 to 3) as in ISO/IEC 13818-3, region 3 being the highest region.

As an example, in the Standard MPEG2 layer 3 twenty-one scale factor bands in the case of so-called long blocks or three times twelve scale factor bands in the case of so-called short blocks are divided up into four regions (16 in FIG. 1, FIG. 2d) in each case, namely 6-5-5-5 scale factor bands per region for long blocks and 9-9-9-9 scale factor bands for short blocks. In each of these regions the scale factors are coded with as many bits as are necessary for the largest scale factor of the respective region. The number of bits used to code each region is signaled via the value "scalefac-compress" in the side information of the bit stream.

In the method according to the present invention the table of the scale factor bandwidths is changed for the sampling rate 8 kHz in such a way that the highest region in the spectrum contains only very few lines, which because of bandwidth restrictions are as a rule not used or only little used anyway.

Figure 2E:
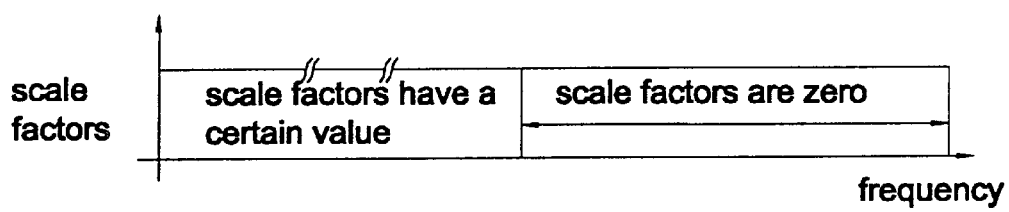
FIG. 2e illustrates the four regions as in FIG. 2d with zero valued scale factors in the highest region in accordance with the present invention.

According to the present invention the scale factors of the scale factor bands of the highest region are set to zero without exception (18 in FIG. 1, FIG. 2e), so that no coding of the scale factors is necessary (22 in FIG. 1).

Because of the free bits resulting from this, additional bits are available for the quantization of the spectrum.

In effect in the method according to the present invention the spectrum is thus divided up for this embodiment into 17 scale factor bands without however having to renounce the bit stream syntax of the Standard MPEG2.

The tables for the scale factor bandwidths are reproduced below. The first table for the widths of the scale factor bands for 16 kHz sampling rate corresponds to the Standard ISO-MPEG2 layer 3. The second table has been modified according to the teaching of the present invention for the 8 kHz sampling rate.

Widths of the Scale Factor Bands for 16 kHz Sampling Rate
(for comparison according to Standard ISO/IEC 13818-3, Table B.2)
Long Blocks 6,6,6,6,6,6,8,10,12,14,16,20,24,28,32,38,46,52,60,68,58,54

| region 0 | region 1 | region 2 | region 3 |

Short Blocks
4,4,4,6,8,10,12,14,18,24,30,40,18
(in accordance with the present invention)
Long Blocks 12,12,12,12,12,12,16,20,24,28,32,40,48,56,64,76,90,2,2,2,2,2

| region 0 | region 1 | region 2 | region 3 |

Short Blocks
8,8,8,12,16,20,24,28,36,2,2,2,26

Figure 2F:
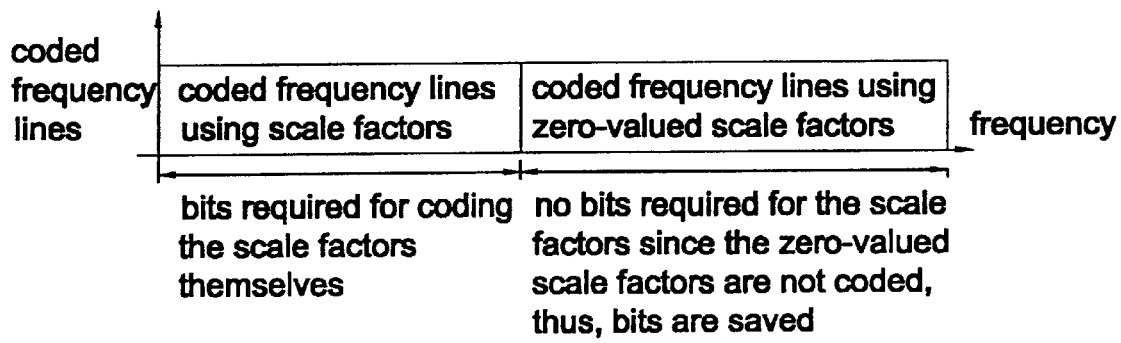
FIG. 2f illustrates the coded frequency lines for the $0^{th}$ to $2^{nd}$ regions for which bits are required for coding the scale factors themselves, and for the 3$^{rd}$ region for which no bits are required for the scale factors.

It can be seen that the last scale factor bandwidths in the method according to the present invention have been markedly reduced compared to the known method according to Standard. In the case of the coding with long blocks, the last 100 frequency lines are coded without scale factor (20 in FIG. 1, FIG. 2f). This corresponds to a restriction of the possible bandwidth from 4000 Hz to 3300 Hz. The desired effect can thus be achieved provided the utilized bandwidth is smaller than 3300 Hz, which at a bit rate of 8 kbit/s, for which the 8 kHz sampling rate is intended, certainly makes sense.

What is claimed is:

1. A method for coding an audio signal digitized at a low sampling rate to obtain time domain audio samples, comprising the following steps:

producing a frequency domain representation of the time domain audio samples, the frequency domain representation including a total number of successive frequency lines;

subdividing the total number of successive frequency lines into a plurality of scale factor bands each scale factor band having a number of successive frequency lines wherein a scale factor is assigned to each scale factor band, the assigned scale factor being used for coding the frequency lines in the respective scale factor band;

forming a plurality of regions, each region including a plurality of successive scale factor bands wherein the scale factors assigned to the plurality of scale factor bands in a region are each coded with the same number of bits, which is determined according to the largest scale factor of the region, and wherein a region including the scale factor bands having frequency lines that correspond to the higher frequency range frequency lines among the frequency lines in all regions is the highest region;

setting to a value of zero the scale factors that are assigned to the scale factor bands in at least the highest region to obtain zero-valued scale factors, the value of zero corresponding to a multiplication factor of 1;

coding the frequency lines of at least the highest region with the zero-valued scale factors; and not coding the zero-valued scale factors of the highest region.

2. A method according to claim 1, wherein the coding is a modification of the Standard ISO/IEC 13818-3:1995.

3. A method according to claim 2, wherein the step of subdividing the total number of frequency lines into scale factor bands is modified relative to the Standard ISO/IEC 13818-3:1995 in such a way that the scale factor bandwidths within the highest region are reduced relative to the scale factor bandwidths of the highest region according to the Standard ISO/IEC 13818-3:1995.

4. A method according to claim 2, wherein a frame header which is a modification of the ISO/IEC 13818-3:1995 frame header is transmitted to signal the non-standard low sampling rate.

5. A method according to claim 4, wherein the hex code of the sync word in the ISO/IEC 13818-3:1995 frame header is "FFE".

6. A method according to claim 1, wherein the bits which are saved, compared to the Standard ISO/IEC 13818-3:1995, through the steps of setting to zero and not coding the zero-valued scale factors are used for a finer quantization of the frequency lines, where this feature is a modification of the Standard ISO/IEC 13818-3:1995.

* * * * *